US012625700B2

(12) United States Patent (10) Patent No.: US 12,625,700 B2
Johnson (45) Date of Patent: May 12, 2026

(54) DIFFERENTIAL CONFIGURATION UPDATES FOR MOBILE DEVICES

(71) Applicant: MOTOROLA SOLUTIONS, INC., Chicago, IL (US)

(72) Inventor: Graeme Johnson, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 299 days.

(21) Appl. No.: 18/468,048

(22) Filed: Sep. 15, 2023

(65) Prior Publication Data

US 2025/0094164 A1 Mar. 20, 2025

(51) Int. Cl.
G06F 8/658 (2018.01)
G06F 8/71 (2018.01)

(52) U.S. Cl.
CPC .............. G06F 8/658 (2018.02); G06F 8/71 (2013.01)

(58) Field of Classification Search
CPC ................................. G06F 8/658; G06F 8/71
See application file for complete search history.

(56) References Cited

U.S. PATENT DOCUMENTS

| 7,487,169 | B2 | 2/2009 | Agarwal | |
| 9,935,652 | B1 | 4/2018 | Chalmer et al. | |
| 2012/0144380 | A1 * | 6/2012 | Rabeler | G06F 8/658 |
| | | | | 717/170 |

FOREIGN PATENT DOCUMENTS

| WO | WO-0067119 | A2 | * | 11/2000 | ............. | G06F 8/658 |
| WO | WO-2007038239 | A2 | * | 4/2007 | ............. | G06F 16/51 |

OTHER PUBLICATIONS

Daemonology.net, "Binary diff/patch utility", <https://www. daemonology.net/bsdiff/>, publicly available at least as early as 2003, 1 page.
Github, "LZHAM—Lossless Data Compression Codec", <https:// github.com/richgel999/lzham_codec>, publicly available at least as early as 2015, 8 pages.
Xdelta, "Xdelta3 License Change", <http://xdelta.org/>, Apr. 2016, 23 pages.
Pocket Soft, "RTPatch Technology Overview", <https://www. pocketsoft.com/rtpatch_binary_diff.html>, publicly available at least as early as 2014, 3 pages.

* cited by examiner

*Primary Examiner* — Geoffrey R St Leger
(74) *Attorney, Agent, or Firm* — Michael Best & Friedrich LLP

(57) ABSTRACT

A system includes memory hardware configured to store instructions and processing hardware configured to execute the instructions. The instructions include loading a legacy configuration file including a plurality of legacy blocks and loading an updated configuration file including a plurality of updated blocks. The instructions include, for each updated block, identifying one legacy block from the plurality of legacy blocks having a same type as the updated block and a payload representing a nearest match to a payload of the updated block and generating an update data object based on an identifier of the legacy block and an identifier of the updated block and adding the update data object to a difference file in response to the identified one legacy block and the updated block having matching payloads but different identifiers. The instructions include transmitting the difference file to a mobile device via a radio network to update the device.

20 Claims, 12 Drawing Sheets

100

102

262

| Offset | Bit7 | Bit6 | Bit5 | Bit4 | Bit3 | Bit2 | Bit1 | Bit0 |
|--------|------|------|------|------|------|------|------|------|
| 0 | New Type LSB | | | | | | | |
| 1 | 0 | 0 | New Type MSB | | | | | |
| 2 | New Identifier LSB | | | | | | | |
| 3 | New Identifier MSB | | | | | | | |
| 4 | New Data Size LSB | | | | | | | |
| 5 | New Data Size MSB | | | | | | | |
| 6+ | Block Payload | | | | | | | |

| Offset | Bit7 | Bit6 | Bit5 | Bit4 | Bit3 | Bit2 | Bit1 | Bit0 |
|--------|------|------|------|------|------|------|------|------|
| 0 | Legacy Type LSB | | | | | | | |
| 1 | 0 | 0 | Legacy Type MSB | | | | | |
| 2 | Legacy Identifier LSB | | | | | | | |
| 3 | Legacy Identifier MSB | | | | | | | |
| 4 | New Data Size LSB = 0x00 | | | | | | | |
| 5 | New Data Size MSB = 0x00 | | | | | | | |

| Offset | Bit7 | Bit6 | Bit5 | Bit4 | Bit3 | Bit2 | Bit1 | Bit0 |
|--------|------|------|------|------|------|------|------|------|
| 0 | New Type LSB | | | | | | | |
| 1 | 0 | 1 | New Type MSB | | | | | |
| 2 | New Identifier LSB | | | | | | | |
| 3 | New Identifier MSB | | | | | | | |
| 4 | Legacy Identifier LSB | | | | | | | |
| 5 | Legacy Identifier MSB | | | | | | | |

| Offset | Bit7 | Bit6 | Bit5 | Bit4 | Bit3 | Bit2 | Bit1 | Bit0 |
|---|---|---|---|---|---|---|---|---|
| 0 | New Type LSB | | | | | | | |
| 1 | 1 | 0 | New Type MSB | | | | | |
| 2 | New Identifier LSB | | | | | | | |
| 3 | New Identifier MSB | | | | | | | |
| 4 | Legacy Identifier LSB (Of Nearest Matching Block) | | | | | | | |
| 5 | Legacy Identifier MSB (Of Nearest Matching Block) | | | | | | | |
| 6+ | New Data Size LSB | | | | | | | |
| 7 | New Data Size MSB | | | | | | | |
| 8+ | XOR Of New Block Payload With Legacy Block Payload From Nearest Matching Legacy Block (Zero Pad Legacy Block Data If Necessary) | | | | | | | |

| Offset | Bit7 | Bit6 | Bit5 | Bit4 | Bit3 | Bit2 | Bit1 | Bit0 |
|---|---|---|---|---|---|---|---|---|
| 0 | New Type LSB | | | | | | | |
| 1 | 1 | 1 | New Type MSB | | | | | |
| 2 | New Identifier LSB | | | | | | | |
| 3 | New Identifier MSB | | | | | | | |
| 4 | Old Identifier LSB (Of Nearest Matching Block) | | | | | | | |
| 5 | Old Identifier MSB (Of Nearest Matching Block) | | | | | | | |
| 6+ | Offset Of Changed Byte LSB | | | | | | | |
| 7 | Offset Of Changed Byte MSB | | | | | | | |
| 8+ | XOR Of New Block Byte With Legacy Block Byte | | | | | | | |

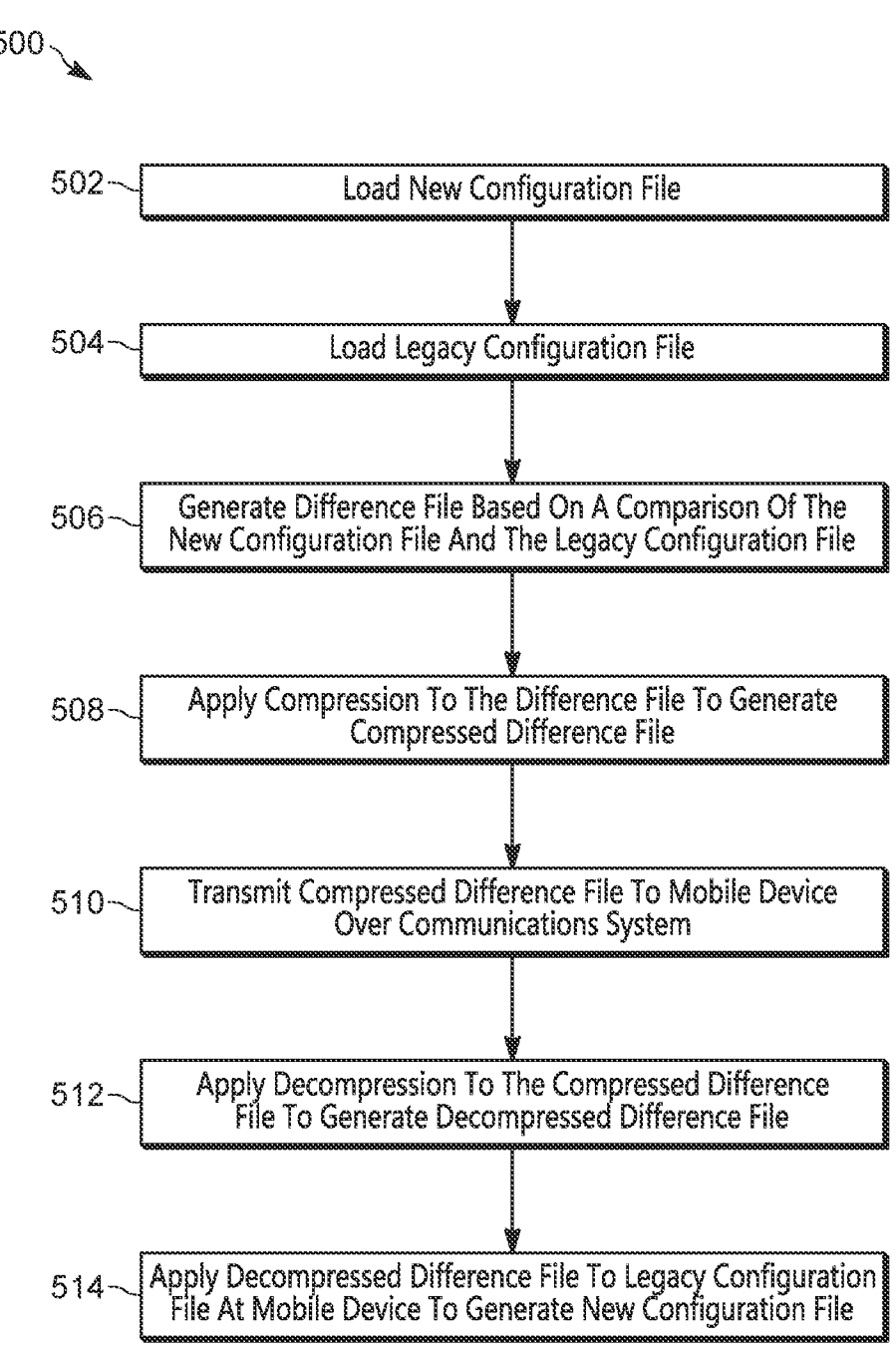

500

502 — Load New Configuration File

504 — Load Legacy Configuration File

506 — Generate Difference File Based On A Comparison Of The New Configuration File And The Legacy Configuration File 508 — Apply Compression To The Difference File To Generate Compressed Difference File 510 — Transmit Compressed Difference File To Mobile Device Over Communications System 512 — Apply Decompression To The Compressed Difference File To Generate Decompressed Difference File 514 — Apply Decompressed Difference File To Legacy Configuration File At Mobile Device To Generate New Configuration File

FIG. 5

DIFFERENTIAL CONFIGURATION UPDATES FOR MOBILE DEVICES

FIELD

The present disclosure relates to communications systems and, more particularly, to performing digital configuration updates for mobile devices used in radio communications systems.

SUMMARY

Low bandwidth wireless connections, such as, for example, land mobile radio (LMR) connections, may make it difficult to transmit configuration updates. For example, radios communicating over LMR connections may use a configuration file (also referred to as a "codeplug") that may control all or many aspects of the radio and, thus, may be a large file (e.g., between about 50 kilobyte and about 5 megabytes). Transmitting such a file over a low bandwidth connection, such as, for example, a LMR connection may provide benefits in terms of accessibility and coverage but may consume a large amount of resources in terms of bandwidth and time. For example, some examples of digital LMR connections offer data transmission rates in a range of between about 4.8 kilobits per second (kbps) to about 9.6 kbps. Reducing file sizes transmitted via such connections offers a variety of technical benefits, for example, by reducing transmission times, making more efficient use of bandwidth, reducing error rates and improving reliability, allowing for better coexistence with voice traffic, and lowering the energy consumption of mobile devices using the LMR connection.

A system includes memory hardware configured to store instructions and processing hardware configured to execute the instructions. The instructions include loading a legacy configuration file including a plurality of legacy blocks and loading an updated configuration file including a plurality of updated blocks. Each of the plurality of legacy blocks includes a type, an identifier, and a payload. Each of the plurality of updated blocks includes a type, an identifier, and a payload. The instructions include, for each updated block of the plurality of updated blocks, identifying one legacy block from the plurality of legacy blocks having the same type as the updated block and a payload representing a nearest match to the payload of the updated block and generating an update data object based on the identifier of the legacy block and the identifier of the updated block and adding the update data object to a difference file in response to the identified one legacy block having a matching payload to the payload of the updated block but a different identifier than the identifier of the updated block. The instructions include transmitting the difference file to a mobile device via a radio network to update the legacy configuration file stored at the mobile device.

In other features, identifying the one legacy block from the plurality of legacy blocks having the same type as the updated block and the payload representing the nearest match to the payload of the updated block includes identifying the one legacy block from the plurality of legacy blocks having a payload with a least number of bytes changed as compared to the payload of the updated block. In other features, the instructions further include, in response to the identified one legacy block not having the matching payload to the payload of the updated block, determining an amount of difference between the payload of the identified one legacy block and the payload of the updated block and generating the update data object based on a comparison of a portion of the payload of the identified one legacy block and a portion of the payload of the updated block and adding the update data object to the difference file in response to the amount of difference satisfying a threshold.

In other features, the threshold is a one-byte difference between the portion of the payload of the identified one legacy block and the portion of the payload of the updated block. In other features, the portion of the identified one legacy block is a byte of the payload of the identified one legacy block that differs from the payload of the updated block. In other features, the comparison includes a bitwise exclusive-OR of the portion of the payload of the identified one legacy block and the portion of the payload of the updated block. In other features, the instructions further include generating the update data object based on the comparison of the payload of the identified one legacy block and the payload of the updated block and adding the update data object to the difference file in response to the amount of difference not satisfying the threshold.

In other features, the instructions further include applying a compression algorithm to at least a portion of the difference file. In other features, the compression algorithm is a binary compression algorithm. In other features, the instructions include excluding the updated block from the difference file in response to determining that the identifier of the updated block matches the identifier of the identified one legacy block and the payload of the updated block matches the payload of the identified one legacy block. In other features, the instructions include determining whether the plurality of legacy blocks includes at least one legacy block having the same type as the updated block, generating the update data object based on the payload of the updated block in response to determining that the plurality of legacy blocks does not include at least one legacy block having the same type as the updated block, determining whether the plurality of updated blocks includes at least one updated block having a same type and a same identifier as a selected legacy block, and generating the update data object based on the identifier of the selected legacy block and having a null size field in response to determining that the plurality of updated blocks does not include at least one updated block having the same type and the same identifier as the selected legacy block.

A computer-implemented method includes loading a legacy configuration file including a plurality of legacy blocks and loading an updated configuration file including a plurality of updated blocks. Each of the plurality of legacy blocks includes a type, an identifier, and a payload. Each of the plurality of updated blocks includes a type, an identifier, and a payload. The method includes, for each updated block of the plurality of updated blocks, identifying one legacy block from the plurality of legacy blocks having the same type as the updated block and a payload representing a nearest match to the payload of the updated block and, in response to the identified one legacy block not having a matching payload to the payload of the updated block, determining an amount of difference between the payload of the identified one legacy block and the payload of the updated block and generating an update data object based on a comparison of a portion of the payload of the identified one legacy block and a portion of the payload of the updated block and adding the update data object to a difference file in response to the amount of difference satisfying a threshold. The method includes transmitting the difference file to a mobile device via a radio network to update the legacy configuration file stored at the mobile device.

In other features, identifying the one legacy block from the plurality of legacy blocks having the same type as the updated block and the payload representing the nearest match to the payload of the updated block includes identifying the one legacy block from the plurality of legacy blocks having a payload with a least number of bytes changed as compared to the payload of the updated block. In other features, the threshold is a one-byte difference between the portion of the payload of the identified one legacy block and the portion of the payload of the updated block. In other features, the portion of the identified one legacy block is a byte of the payload of the identified one legacy block that differs from the payload of the updated block. In other features, the comparison includes a bitwise exclusive-OR of the portion of the payload of the identified one legacy block and the portion of the payload of the updated block.

A non-transitory computer-readable medium includes executable instructions. The executable instructions include loading a legacy configuration file including a plurality of legacy blocks and loading an updated configuration file including a plurality of updated blocks. Each of the plurality of legacy blocks includes a type, an identifier, and a payload. Each of the plurality of updated blocks includes a type, an identifier, and a payload. The executable instructions include, for each updated block of the plurality of updated blocks, identifying one legacy block from the plurality of legacy blocks having the same type as the updated block and a payload representing a nearest match to the payload of the updated block and generating an update data object based on the identifier of the legacy block and the identifier of the updated block and adding the update data object to a difference file in response to the identified one legacy block having a matching payload to the payload of the updated block but a different identifier than the identifier of the updated block. The executable instructions include transmitting the difference file to a mobile device via a radio network to update the legacy configuration file stored at the mobile device.

In other features, identifying the one legacy block from the plurality of legacy blocks having the same type as the updated block and the payload representing the nearest match to the payload of the updated block includes identifying the one legacy block from the plurality of legacy blocks having a payload with a least number of bytes changed as compared to the payload of the updated block. In other features, the executable instructions further include, in response to the identified one legacy block not having the matching payload to the payload of the updated block, determining an amount of difference between the payload of the identified one legacy block and the payload of the updated block and generating the update data object based on a comparison of a portion of the payload of the identified one legacy block and a portion of the payload of the updated block and adding the update data object to the difference file in response to the amount of difference satisfying a threshold. In other features, the executable instructions further include determining whether the plurality of legacy blocks includes at least one legacy block having the same type as the updated block and generating the update data object based on the payload of the updated block in response to determining that the plurality of legacy blocks does not include at least one legacy block having the same type as the updated block.

Other examples, embodiments, features, and aspects will become apparent by consideration of the detailed description and accompanying drawings.

BRIEF DESCRIPTION OF THE DRAWINGS

FIG. 3A is a schematic illustration of an example update data object that instructs a mobile device to write a block of a new configuration file to a legacy configuration file.

FIG. 3B is a schematic illustration of an example update data object that instructs a mobile device to delete a block of a legacy configuration file.

FIG. 3C is a schematic illustration of an example update data object that instructs a mobile device to associate a block in a legacy configuration file with a block in a new configuration file.

FIG. 3D is a schematic illustration of an example update data object that instructs a mobile device to modify a portion of a block from a legacy configuration file based on differences with a block from a new configuration file.

FIG. 3E is a schematic illustration of an example update data object that instructs a mobile device to modify a portion of a block from a legacy configuration file based on a single-byte difference with a block from a new configuration file.

FIG. 5 is a flowchart of an example process for generating a compressed difference file and updating a legacy configuration file to a new configuration file using the compressed difference file.

In the drawings, reference numbers may be reused to identify similar and/or identical elements.

DETAILED DESCRIPTION

Figure 1:
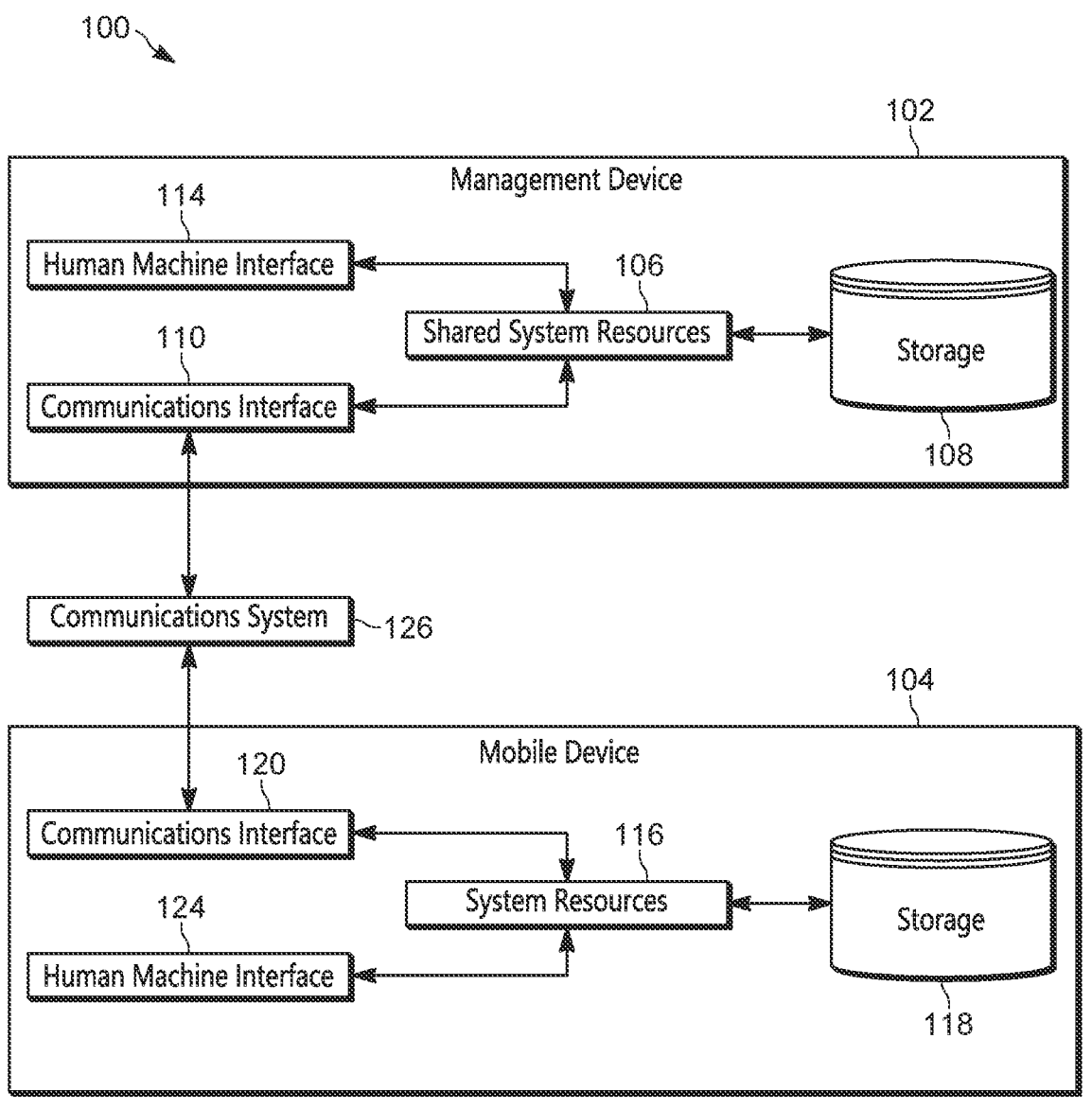
FIG. 1 is a block diagram of an example communications system.

FIG. 1 is a block diagram of a communications system 100. As shown in FIG. 1, some examples of the communications system 100 include a management device 102 and a mobile device 104. In some examples, the mobile device 104 may be a land mobile radio system radio and the management device 102 may be configured to define and modify configuration settings of the mobile device 104, such as, for example, by transmitting a configuration file to the mobile device 104 or updates to the same as described herein. In various implementations, the management device 102 includes system resources 106, non-transitory computer-readable storage media, such as storage 108, a communications interface 110, and a human machine interface 114. In some embodiments, the system resources 106 include one or more electronic processors, one or more graphics processing units, volatile computer memory, non-volatile computer memory, and/or one or more system buses interconnecting the components of management device 102. In some examples, the human machine interface 114 includes one or more input devices (such as a keyboard, mouse, touchpad, touchscreen, microphone, webcam, and/or voice recognition system) and/or one or more output devices (such as a display, speakers, headphones/earphones, and/or haptic device). While a single mobile device 104 is illustrated in FIG. 1, the system 100 may include any number of mobile devices. Furthermore, while a single management device 102 is shown in FIG. 1, the functionality of the management device 102 may be distributed across multiple management devices (for example, in a server or cloud-based configuration).

In various implementations, the mobile device 104 includes system resources 116, non-transitory computer-readable storage media such as storage 118, a communications interface 120, and a human machine interface 124. In some embodiments, the system resources 116 include one or more electronic processors, one or more graphics processing units, volatile computer memory, non-volatile computer memory, and/or one or more system buses interconnecting the components of mobile device 104. In some examples, the human machine interface 114 includes one or more input devices (such as a microphone, a push-to-talk button, a keypad, rotary knobs, buttons, and/or a touchscreen) and/or one or more output devices (such as a display, speakers, indicator lights, and/or haptic device).

In some examples, the management device 102 and the mobile device 104 communicate via the communications interface 110 and the communications interface 120. The communications interface 110 may send signals to and/or receive signals from communications interface 120 over communications system 126. In various implementations, communications interface 110 and communications interface 120 include land mobile radio system transceivers, and communications system 126 operates according to a land mobile radio protocol. For example, the land mobile radio protocol may include the Project 25 (P25) standard developed by the Association of Public-Safety Communications Officials (APCO), the Terrestrial Trunked Radio (TETRA) specification, the Digital Mobile Radio (DMR) standard, the Next Generation Digital Narrowband (NXDN) standard, the Digital Private Mobile Radio (dPMR) standard, and/or the OpenSky standard. However, it should be understood that other types of low bandwidth communication systems may by the system 100. In some examples, communications systems having throughputs of less than one megabit per second may be considered "low bandwidth." Also, in some embodiments, in addition to or as an alternative to communicating via a low bandwidth communication system, the system 100 may communicate via a broadband wireless link protocol, such as, for example, Institute of Electrical and Electronics Engineers (IEEE) 802.11 standard (Wi-Fi), the IEEE 802.16 standard (WiMAX), the Long Term Evolution (LTE) standard, the 5G New Radio (NR) standard, the Code Division Multiple Access 2000 (CDMA2000) standard, the Evolved Packet Core (EPC) standard, and/or one or more satellite broadband protocols. In these embodiments, the system 100 may include separate communication interfaces (e.g., transceivers) for broadband communication.

Figure 2:
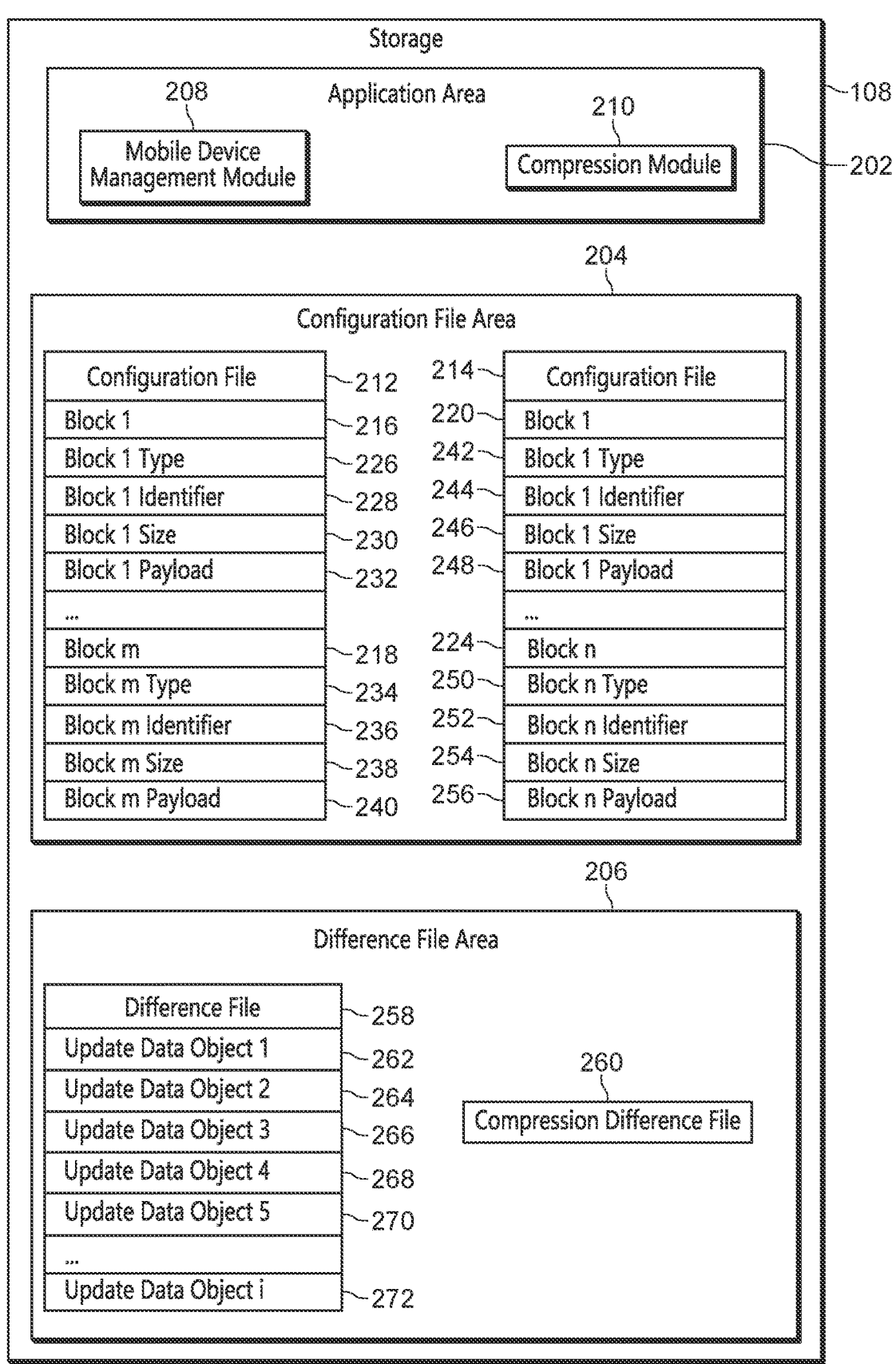
FIG. 2 is a block diagram showing example data objects stored in storage of a device management platform.

FIG. 2 is a block diagram showing example data objects that may be stored in the storage 108 of the management device 102. For example, the storage 108 may include an application area 202, a configuration file area 204, and a difference file area 206 (although data may be stored in various configurations on one or more data storage areas on one or more data storage devices). The application area 202 may include a mobile device management module 208 for managing the mobile device 104 of system 100 and/or a compression module 210 for compressing data transmit to the mobile device 104. The configuration file area 204 may include one more configuration files for the mobile device 104. For example, in some configuration, the management device 102 stores two configuration files for the mobile device 104: a configuration file 212 representing a legacy configuration file and a configuration file 214 representing a new configuration file, which may be based on input received from a user. In various implementations, each configuration file may be a binary file divided into one or more blocks. For example, configuration file 212 is shown with m blocks 216-218 (where m may be any number) and configuration file 214 is shown with n blocks 220-224 (where n may be any number). As noted above, the configuration files 212 and 214 may include files referred to as "codeplugs" for radio devices, and such a codeplug may define all or a subset of functionality performed by a radio device.

Each block of a configuration file may include configuration fields associated with a given feature of mobile device 104. Each block may contain, for example, at the beginning of the block, one or more header fields. Examples of header fields include a type field (such as type fields 226, 234, 242, and 250) containing a numerical identifier of the block type. Header fields may also include an identifier field (such as identifier fields 228, 236, 244, and 252) containing a numerical identifier of the specific instance of the block. In examples where configuration files include multiple instances of the same type of block, identifier fields may distinguish between different instances of the same type of block. In some embodiments, header fields may include a size field (such as size fields 230, 238, 248, and 256) indicating a size of the block (for example, in bytes). Each block may contain, for example, after the header fields, a payload (such as payloads 232, 240, 248, and 256). In various implementations, the header fields identify the block and/or the payload, while the payload contains the actual data or content of the block. In some examples, each of the type, identifier, and size fields are 16-bit fields.

In implementations where the mobile device 104 is a land mobile radio system radio, the configuration file may include one or more types of blocks, such as frequency information blocks, channel information blocks, zone information blocks, scanning preferences blocks, security settings blocks, identification data blocks, functional settings blocks, network settings blocks, roaming lists blocks, emergency features blocks, interoperability settings blocks, location settings blocks, and/or user interface customization blocks. In some examples, payloads of frequency information blocks include lists of frequencies that the mobile device 104 can transmit and receive on, transmission power levels for each frequency, and/or squelch settings. In some embodiments, payloads of channel information blocks include lists of channels that the mobile device 104 can access and/or priority levels for different channels.

In various implementations, payloads of zone information blocks include specific sets of channels organized into one or more zones. In some examples, payloads of scanning preferences blocks include lists of channels to monitor in scan mode and/or priorities for scanning channels. In some embodiments, payloads of security settings blocks include encryption keys for secure communications and/or authentication settings to validate access by the mobile device 104 to parts of the communications system 126. In various implementations, payloads of identification data blocks include identification and/or serial numbers of the mobile device 104 and/or identification data of users. In some examples, payloads of functional settings blocks include settings for the mobile device 104 (such as keypad lock settings, power-saving modes, backlight settings, tone settings, and/or other settings).

In some embodiments, payloads of network settings blocks include Internet Protocol (IP) addresses for Internet Protocol-based features of the mobile device 104. In various implementations, payloads of roaming lists blocks include rules defining when to roam from one site or repeater to another based on signal strength or other criteria. In some examples, payloads of emergency features blocks include configurations related to emergency signals or alerts, including which channels to broadcast emergency alerts to. In some embodiments, payloads of interoperability settings blocks include frequencies, channels, and/or protocols for the mobile device 104 to use when interoperating with other systems. In various implementations, payloads of location settings blocks include settings related to how often to report location data of the mobile device 104 and/or which channels to use. In some examples, payloads of user interface customization blocks include configuration settings for human machine interface 124.

In some embodiments, the mobile device management module 208 may be configured to update a legacy configuration file in the mobile device 104 with a new configuration file. The management device 102 may include a stored copy of the legacy configuration file (for example, configuration file 212) and a stored copy of the updated, new configuration file (for example, configuration file 214). As will be described in detail further with respect to FIGS. 3A-7, the mobile device management module 208 may compare the legacy configuration file to the new configuration file and generate a difference file 258 documenting differences between the legacy configuration file and the new configuration file. The difference file 258 may be divided into one or more update data objects, such as update data objects 262-272. While six update data objects are illustrated in FIG. 2, the difference file 258 may include any number i of update data objects. Each update data object may include instructions to update a block (or add a block to or delete a block from) of the legacy configuration file based on differences between the legacy configuration file and the new configuration file. In various implementations, the difference file 258 includes multiple update data objects 262-272 concatenated end-to-end.

In various implementations, the difference file 258 includes one or more different types of update data objects with instructions for performing different types of update operations on the legacy configuration file. For example, the difference file 258 may include instructions to write a new block to the legacy configuration file (such as update data object 262). The mobile device management module 208 may generate update data object 262 in response to not finding any blocks in the legacy configuration file having the same block type as a block in the new configuration file. In such a scenario, the mobile device management module 208 adds update data object 262 to the difference file 258, wherein the update data object 262 represents instructions to write the block of the new configuration file to the legacy configuration file.

FIG. 3A is a schematic illustration of an example of an update data object 262 that instructs the mobile device update module 408 to write a block of the new configuration file to the legacy configuration file. As illustrated in FIG. 3A, the update data object 262 includes seven or more offsets (or segments of data) with each offset containing eight bits of data (or a byte of data). For example, as shown in FIG. 3A, the first offset 302 may include the least significant byte (LSB) from the type field of the block of the new configuration file. In computing, a "word" may refer to a fixed-size piece of data that a processor handles as a unit. The processor may perform data manipulations and calculations using words. A "least significant byte" may refer to the bytes in a multi-byte word that has the least influence on the value of the word. A "most significant byte" may refer to the bytes in the multi-byte word that has the most influence on the value of the word. In a big-endian system, the most significant byte may be stored at the lowest memory address (e.g., as the first byte) and the least significant byte may be stored at the highest memory address (e.g., as the last byte). By contrast, in a little-endian system, the least significant byte may be stored at the lowest memory address (e.g., as the first byte) and the most significant byte may be stored at the highest memory address (e.g., as the last byte).

In various implementations, the two most significant bits of the second offset 304 may be replaced with 00. These two bits may be used to identify the format of the update data object (for example, 00 may identify that the update data object contains instructions to write a new block of the new configuration file to the legacy configuration file or delete a block from the legacy configuration file.) The third offset 306 may include the least significant byte from the identifier field of the block of the new configuration file. The fourth offset 308 may include the most significant byte from the identifier field of the block of the new configuration file. The fifth offset 310 may include least significant byte from the size field of the block of the new configuration file. The sixth offset 312 may include the most significant byte from the size field of the block of the new configuration file. The seventh offset 314 and subsequent offsets may include the payload of the block of the new configuration file.

Returning to FIG. 2, in some examples, the difference file 258 may include an update data object 264 that includes instructions to delete a block from the legacy configuration file. The mobile device management module 208 may generate the update data object 264 in response to not finding any blocks in the new configuration file having the same type field and identifier field as a block in the legacy configuration file. In such a scenario, the mobile device management module 208 adds the update data object 264 to the difference file 258, wherein the update data object 264 includes instructions to delete the block of the legacy configuration file.

FIG. 3B is a schematic illustration of an example of the update data object 264. As illustrated in FIG. 3B, the update data object 264 includes six offsets with each offset containing eight bits of data. For example, as shown in FIG. 3B, the first offset 316 may include the least significant byte from the type field of the block of the legacy configuration file. The second offset 318 may include the most significant byte from the type field of the block of the old configuration file. In some embodiments, the two most significant bits of the second offset 318 may be replaced with 00. These two bits may be used to identify the format of the update data object (for example, 00 may identify that the update data object contains instructions to write a new block of the new configuration file to the legacy configuration file or delete a block from the legacy configuration file.) The third offset 320 may include the least significant byte from the identifier field of the block of the legacy configuration file. The fourth offset 322 may include the most significant byte from the identifier field of the block of the legacy configuration file. The fifth offset 324 may include the least significant byte of a new size field. In some embodiments, the value of the fifth offset 324 may be set to 0×00. The sixth offset 326 may include the most significant byte of the new size field. In some embodiments, the value of the sixth offset 326 may be set to 0×00.

Returning to FIG. 2, the difference file 258 may include an update data object 266 that includes instructions associating a block in the legacy configuration file with a block in the new configuration file. For example, the block in the legacy configuration file and the block in the new configuration file may have the same content (e.g., type, size, and/or payload) but may have a different identifier field. The update data object 264 includes instructions for updating the existing block (e.g., the data in the header) in the legacy configuration file to match the block in the new configuration file.

FIG. 3C is a schematic illustration of an example of the update data object 266. As illustrated in FIG. 3C, the update data object 266 includes six offsets with each offset containing eight bits of data. In various embodiments, the first offset 328 includes the least significant byte from the type field of the block of the new configuration file. The second offset 330 may include the most significant byte from the type field of the block of the new configuration file. In some examples, the two most significant bits of the second offset 330 are replaced with 01. These two bits may be used to identify the format of the update data object (for example, 01 may identify that the update data object contains instructions associating a block in the legacy configuration file with a block in the new configuration file). The third offset 332 may include the least significant byte from the identifier field of the block of the new configuration file. The fourth offset 334 may include the most significant byte from the identifier field of the block of the new configuration file. The fifth offset 336 may include the least significant byte from the identifier field of the legacy configuration file. The sixth offset 338 may include the most significant byte from the identifier field of the legacy configuration file.

Returning to FIG. 2, in some examples, the difference file 258 may include an update data object 268 including instructions to modify a portion of a block from the legacy configuration file based on differences with a block from the new configuration file. The mobile device management module 208 may generate update data object 268 in response to finding a block in the legacy configuration file with a payload similar, but not identical to, a payload of a block in the new configuration file. In such a scenario, the mobile device management module 208 adds update data object 268 to difference file 258, wherein the update data object 268 includes instructions to update the payload of the block of the legacy configuration file to match the payload of the block of the new configuration file.

FIG. 3D is a schematic illustration of an example update data object 268. As illustrated in FIG. 3D, some examples of the update data object 268 include nine or more offsets with each offset containing eight bits of data. The first offset 340 may include the least significant byte of the type field of the block of the new configuration file. The second offset 342 may include the most significant byte of the type field of the block of the new configuration file. In various implementations, the two most significant bits of the second offset 342 may be replaced with 10. These two bits may be used to identify the format of the update data object (for example, 10 may identify that the update data object contains instructions to modify a portion of a block from the legacy configuration file based on differences with a block from the new configuration file).

The third offset 344 may include the least significant byte of the identifier field of the block of the new configuration file. The fourth offset 346 may include the most significant byte of the identifier field of the block of the new configuration file. The fifth offset 348 may include the least significant byte of the identifier field of the block of the legacy configuration file that most closely matches the block of the new configuration file. The sixth offset 350 may include the most significant byte of the identifier field of the block of the legacy configuration file that most closely matches the block of the new configuration file. The seventh offset 352 may include the least significant byte of the size field of the block of the new configuration file. The eighth offset 354 may include the most significant byte of the size field of the block of the new configuration file. The ninth offset 356 and subsequent offsets may include an exclusive-or comparison (XOR) comparison of the payload of the block from the new configuration file with the payload of the block from the legacy configuration file. In examples where the payloads have different lengths, the payloads may be zero padded as necessary. Examples of suitable algorithms for generating the comparison will be described further on in this specification with reference to process 700 and FIG. 7.

Returning to FIG. 2, in some examples the difference file 258 may include an updated data object 270 that includes instructions to modify a portion of a block from the legacy configuration file based on a single-byte difference with a block from the new configuration file. The mobile device management module 208 may generate the update data object 268 in response to finding a block in the legacy configuration file with a payload similar to but differing by a single byte to a payload of a block in the new configuration file. In such a scenario, the mobile device management module 208 adds the update data object 268 to difference file 258, wherein the update data object 270 includes instructions to update the byte of the payload of the block of the legacy configuration file to match the byte of the payload of the block of the new configuration file.

FIG. 3E is a schematic illustration of an example of the update data object 270. As illustrated in FIG. 3E, some examples of the update data object 270 include nine or more offsets with each offset containing eight bits of data. The first offset 358 may include the least significant byte of the type field of the block of the new configuration file. The second offset 360 may include the most significant byte of the type field of the block of the new configuration file. In various implementations, the two most significant bits of the second offset 360 may be replaced with 11. These two bits may be used to identify the format of the update data object (for example, 11 may identify that the update data object contains instructions to modify a portion of a block from the legacy configuration file based on a single-byte difference with a block from the new configuration file).

The third offset 362 may include the least significant byte of the identifier field of the block of the new configuration file. The fourth offset 364 may include the most significant byte of the identifier field of the block of the new configuration file. The fifth offset 366 may include the least significant byte of the identifier field of the block of the legacy configuration file that most closely matches the block of the new configuration file. The sixth offset 368 may include the most significant byte of the identifier field of the block of the legacy configuration file that most closely matches the block of the new configuration file. The seventh offset 370 may include the least significant byte of changed byte. The eighth offset 372 may include the most significant byte of the changed. The ninth offset 374 may include an exclusive-or comparison (XOR) comparison of the byte of the payload of the block from the new configuration file with the byte of the payload of the block from the legacy configuration file. Examples of suitable algorithms for generating the comparison will be described further on in this specification with reference to process 700 and FIG. 7.

Figure 4:
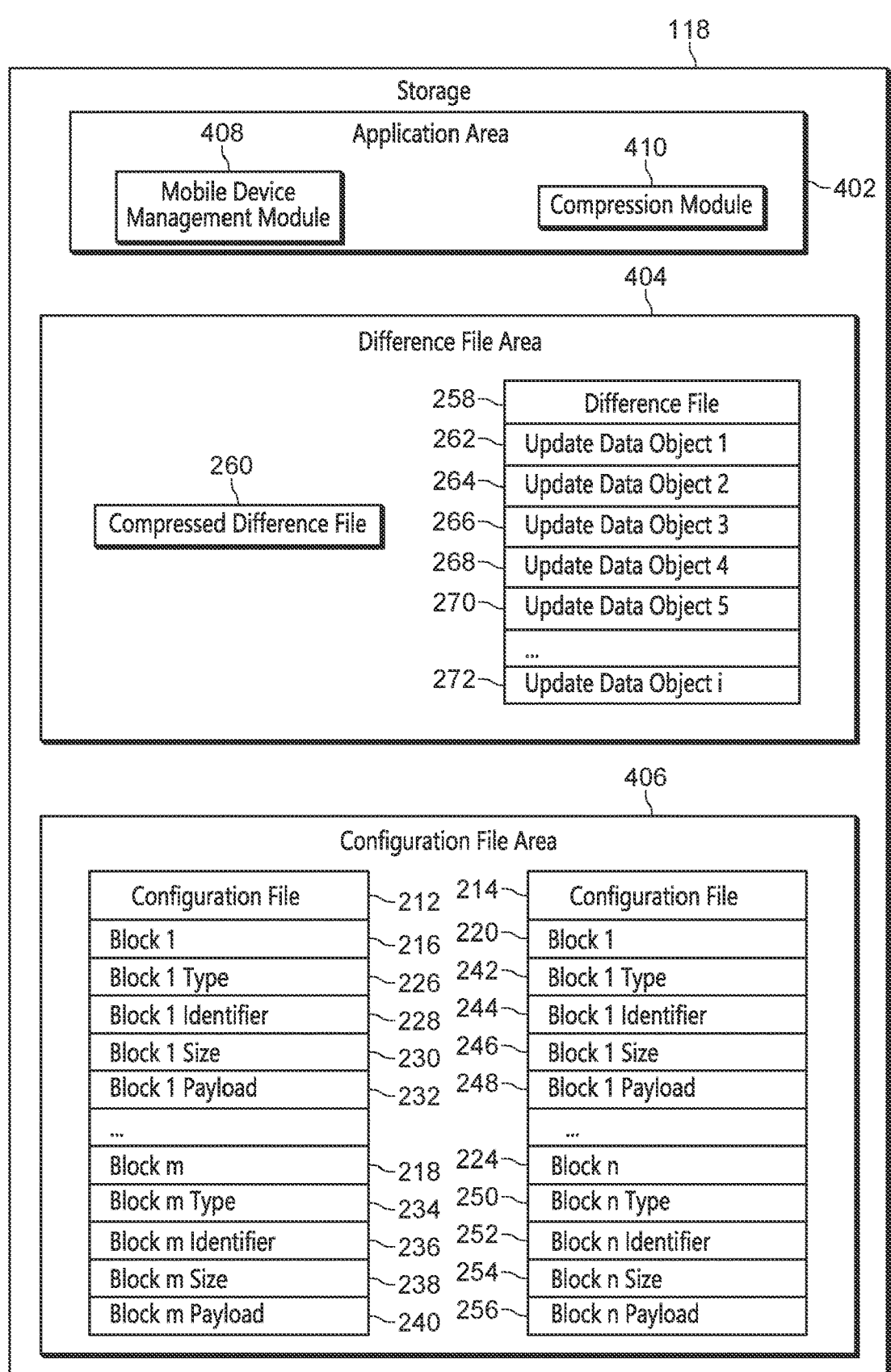
FIG. 4 is a block diagram showing example data objects that may be stored in storage of a mobile device.
Figure 6A:
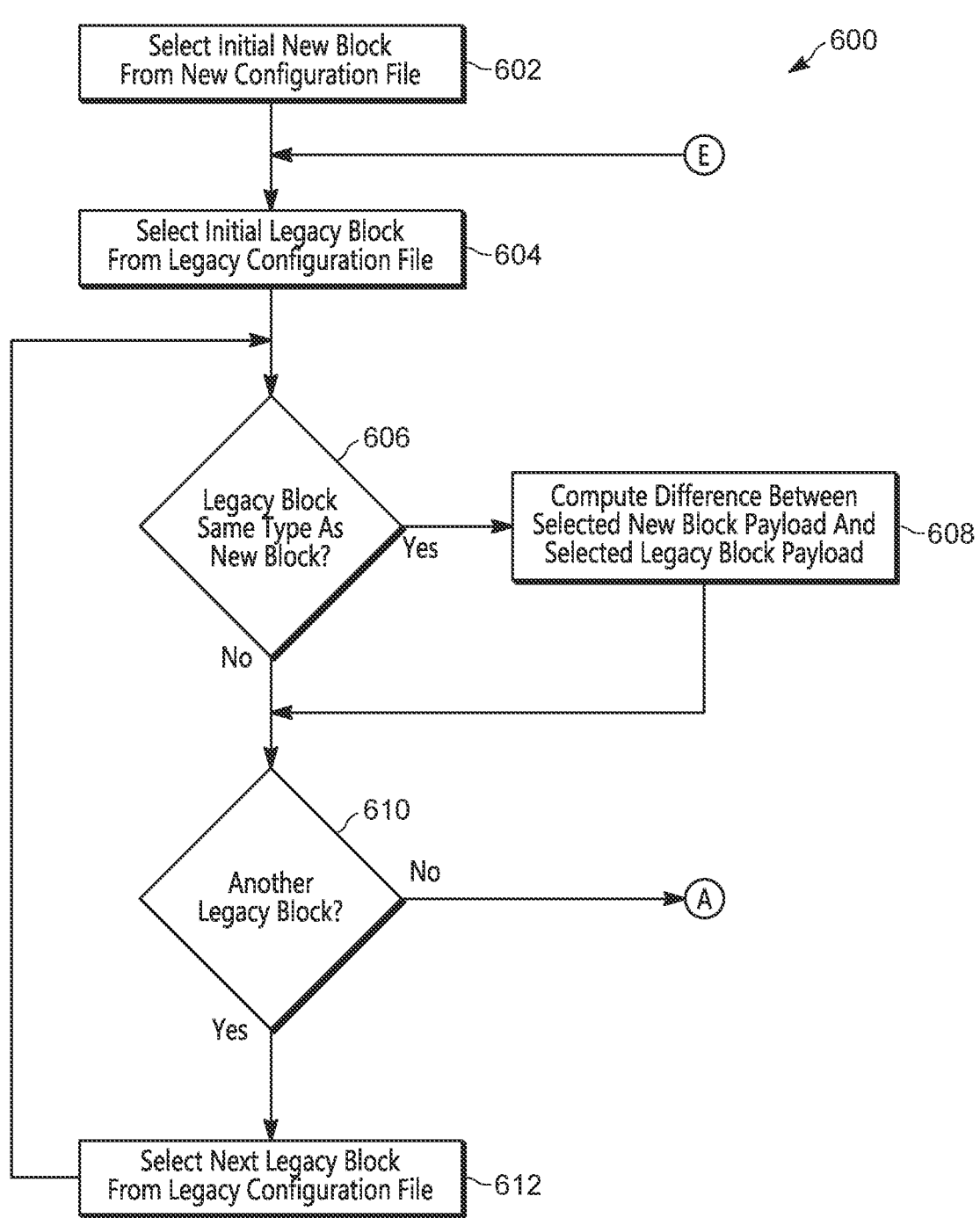
FIGS. 6A-6E are flowcharts of an example process for generating a difference file based on a comparison of a new configuration file and a legacy configuration file.
Figure 6B:
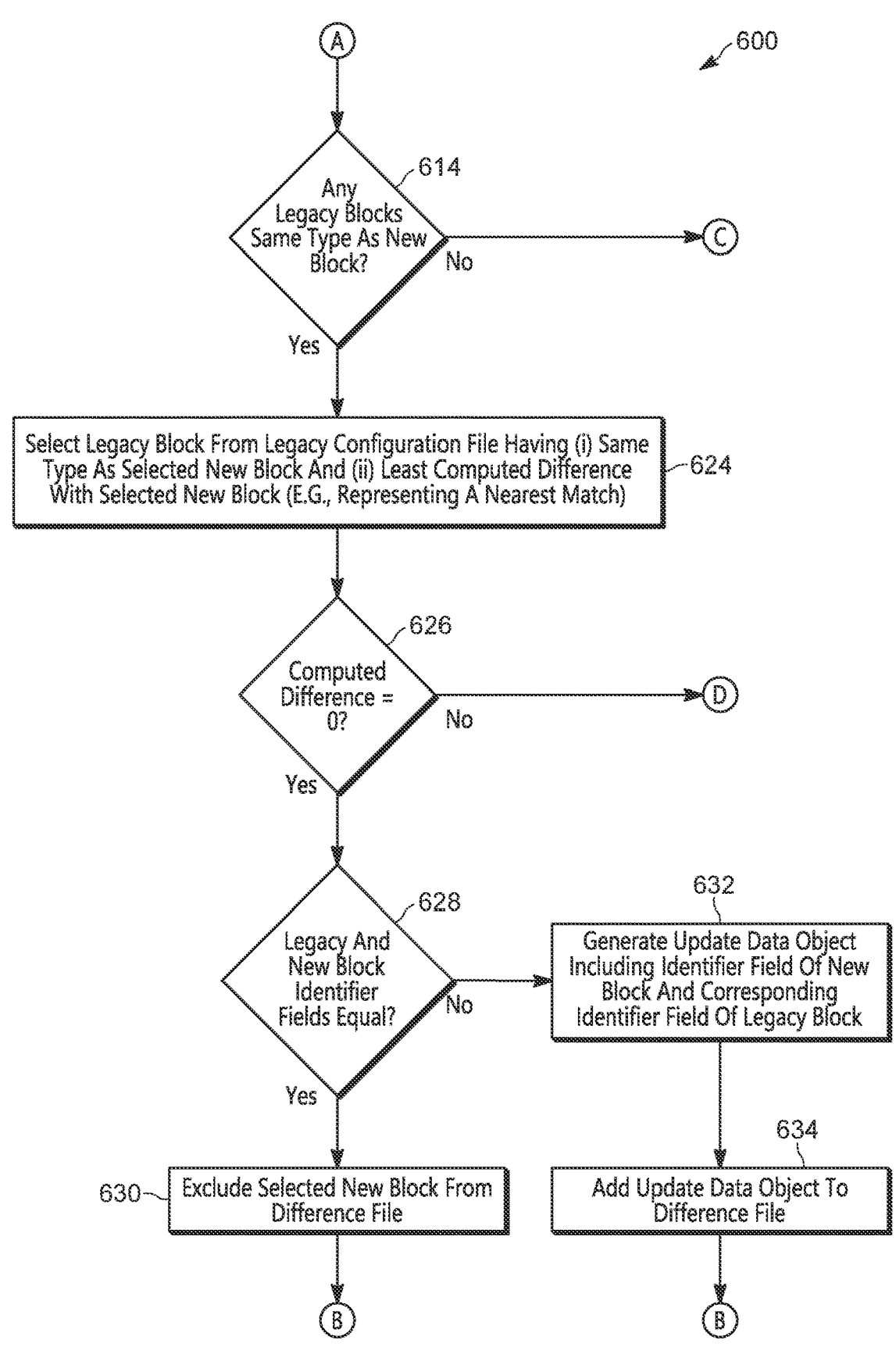
Figure 6C:
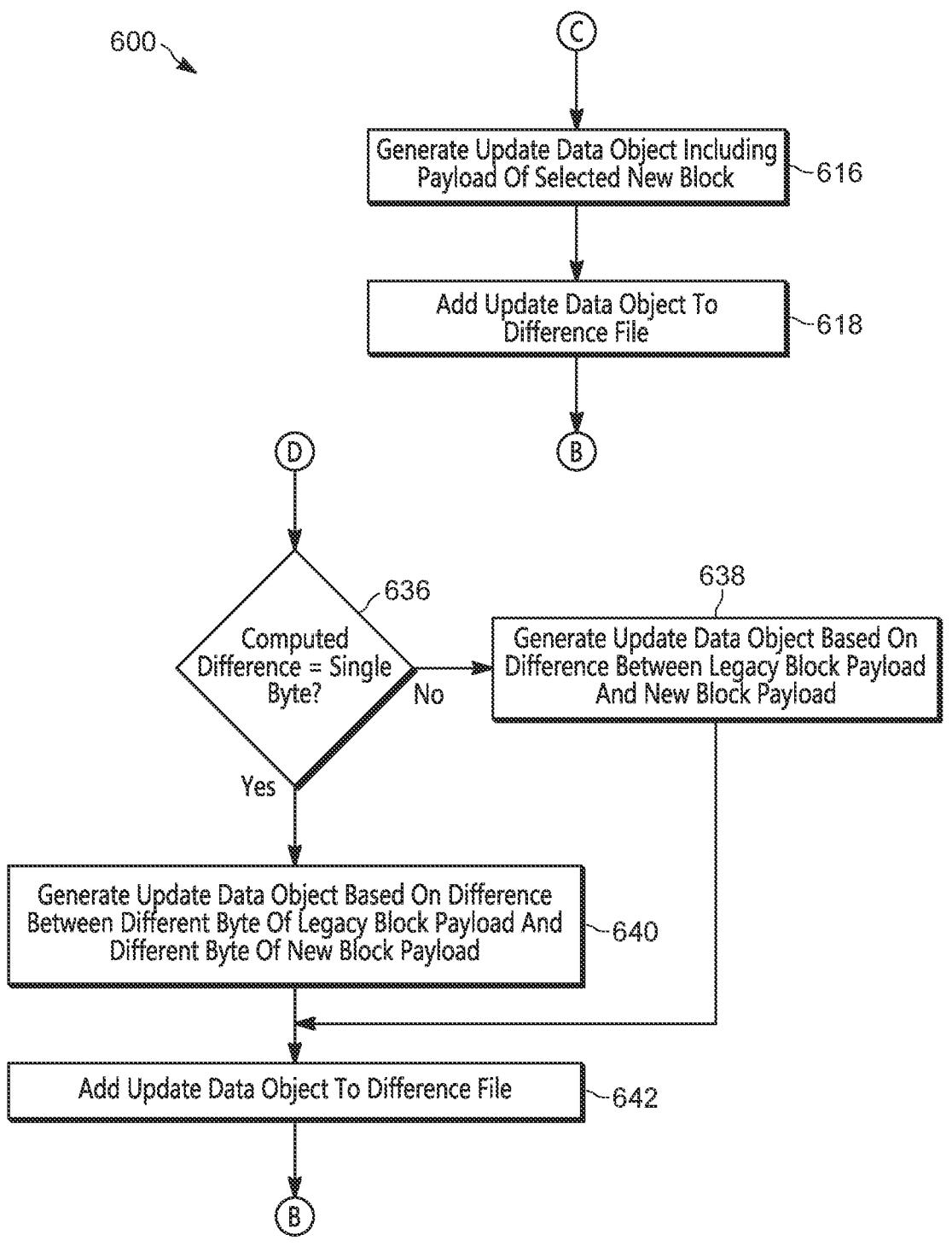
Figure 6D:
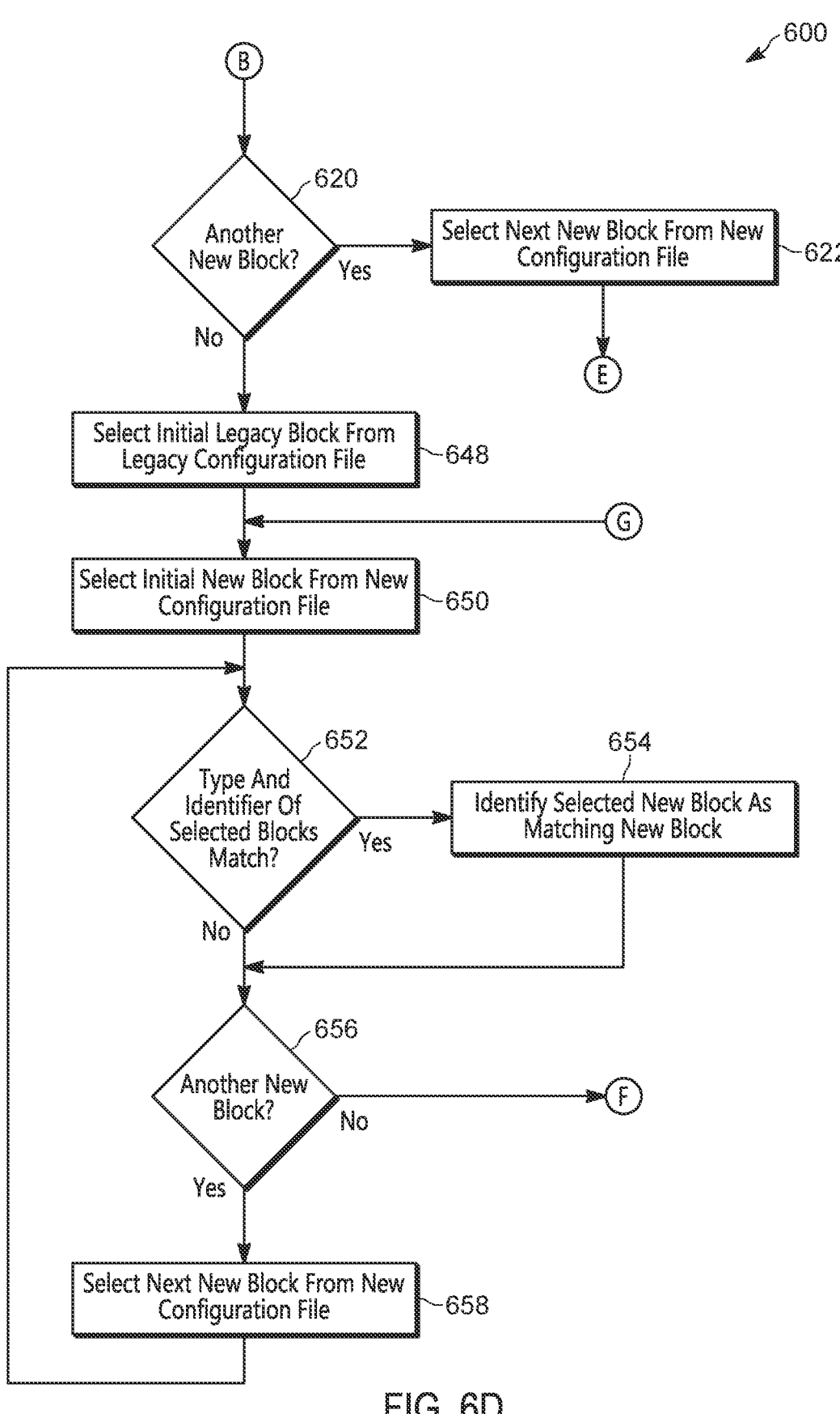
Figure 6E:
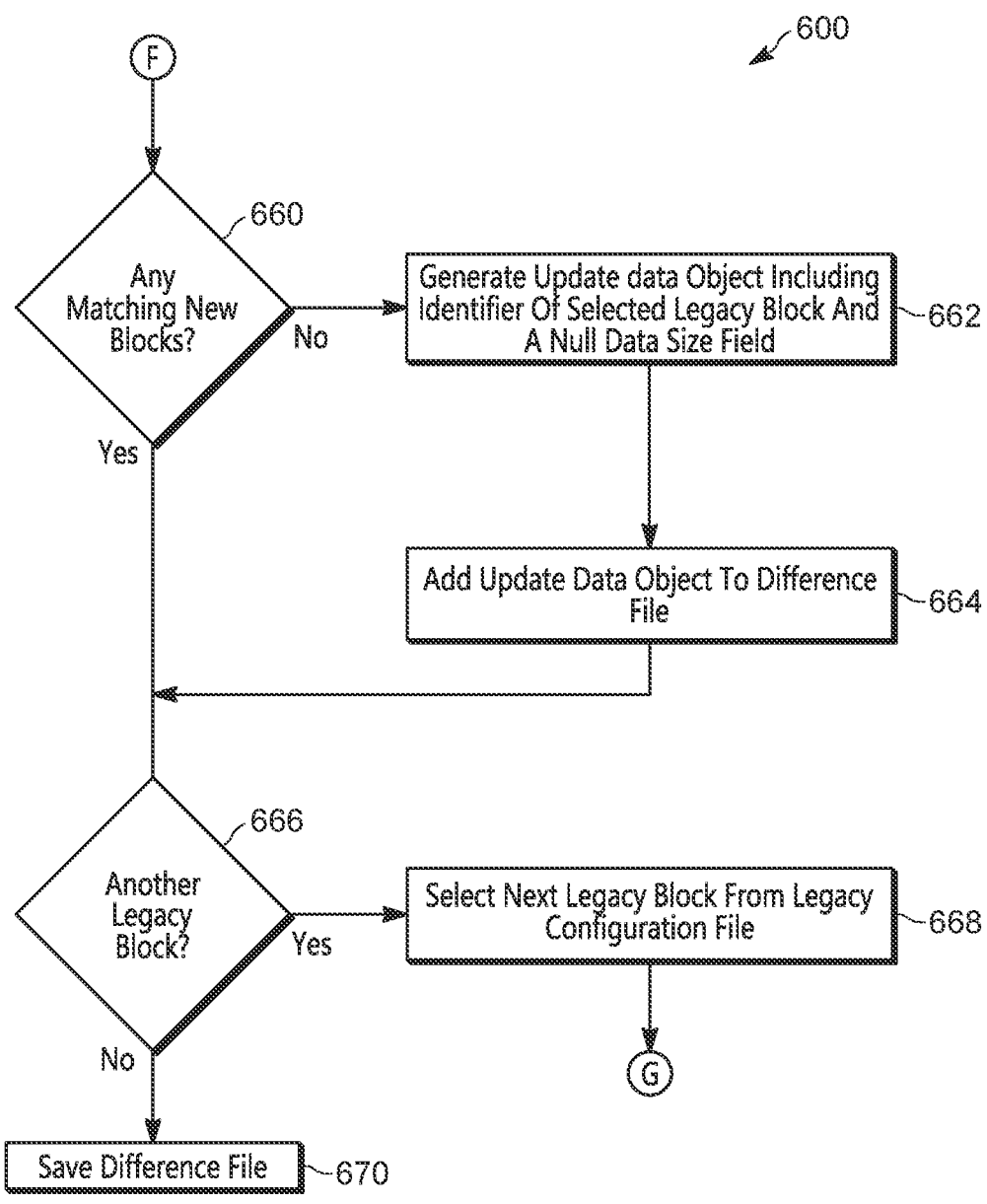

FIG. 4 is a block diagram showing example data objects that may be stored in the storage 118 of mobile device 104.

In various implementations, the storage 118 includes an application area 402, a difference file area 404, and a configuration file area 406 (although data may be stored in various configuration in one or more data storage areas on one or more data storage devices). As illustrated in FIG. 4, the application area 402 may include a mobile device update module 408 and a decompression module 410. In some embodiments, the mobile device update module 408 receives a (optionally compressed) difference file 260 from the management device 102 via communications system 126. In various implementations, the mobile device update module 408 saves the compressed difference file 260. The decompression module 410 decompresses the compressed difference file 260 to generate a difference file 258. The mobile device update module 408 updates a legacy configuration file 212 stored on the mobile device 104 based on instructions in the received (and decompressed) difference file 258 to generate a new or updated configuration file 214.

FIG. 5 is a flowchart of an example process 500 for generating a difference file and updating a legacy configuration file stored on the mobile device 104 to a new configuration file using the compressed difference file. At step 502, the mobile device management module 208 loads the new configuration file 214. In various implementations, the mobile device management module 208 generates one or more user interfaces that allow a user to select, view, and edit a configuration file for a particular mobile device. For example, the user may edit configuration file 212 via the one or more user interfaces and save the edited configuration file as configuration file 214. At step 504, the mobile device management module 208 loads the legacy configuration file 212. At step 506, mobile device management module 208 generates the difference file 258 based on a comparison of the new configuration file 214 and the legacy configuration file 212. Additional details associated with generating the difference file will be described with respect to process 600 and FIGS. 6A-6E. At step 508, the compression module 210 applies a compression algorithm to the difference file 258 to generate the compressed difference file 260. In various implementations, the compression algorithm is a binary compression algorithm such as the LZ77 algorithm, the LZ78 algorithm, the DEFLATE algorithm, the Lempel-Ziv-Welch (LZW) algorithm, the Lempel-Ziv-Storer-Szymanski (LZSS) algorithm, the Lempel-Ziv-Markov chain algorithm (LZMA), the Brotli algorithm, the Zstandard (zstd) algorithm, and/or the dynamic Markov compression (DMC) algorithm.

At step 510, the mobile device management module 208 transmits the compressed difference file 260 to the mobile device 104 over communications system 126. For example, the mobile device management module 208 transmits the compressed difference file 260 to the mobile device 104 via the communications interface 110, the communications system 126, and the communications interface 120. At the mobile device 104, the mobile device update module 408 receives the compressed difference 260 file from communications interface 120 and saves the compressed difference file 260. At step 512, the decompression module 410 applies a decompression algorithm to the compressed difference file 260 to generate (retrieve) the decompressed difference file 258 and saves the decompressed difference file to difference file area 404. In some embodiments, the decompression algorithm corresponds to the compression algorithm used at block 508.

At step 514, the mobile device update module 408 applies the instructions contained in the update data objects of the difference file 258 to the legacy configuration file 212 to generate the new configuration file 214. For example, in embodiments where the difference file 258 contains the update data object 262, the mobile device update module 408 adds the new block to legacy configuration file 212 according to update data object 262. In examples where the difference file 258 contains the update data object 264, the mobile device update module 408 deletes the block from legacy configuration file 212 according to update data object 262. In implementations where the difference file 258 contains the update data object 266, the mobile device update module 408 updates the identifier field of the block in the legacy configuration file 212 according to the update data object 266. In embodiments where the difference file 258 contains the update data object 268 and/or the update data object 270, the mobile device update module 408 modifies the portion of the block in the legacy configuration file 212 according to the update data object 268 and/or update data object 270. After applying updates according to update data objects in the difference file 258, the mobile device update module 408 saves the updated legacy configuration file 214 as new configuration file (for example, in the configuration file area 204).

FIGS. 6A-6E are flowcharts of an example process 600 for generating the difference file 258 based on a comparison of the new configuration file 214 and the legacy configuration file 212. At step 602, the mobile device management module 208 selects an initial update block from the new configuration file 214. At step 604, the mobile device management module 208 selects an initial legacy block from the legacy configuration file 212. At step 606, the mobile device management module 208 determines whether a type field of the selected legacy block is the same as a type field of the selected new block. In response to determining that the type fields of the selected legacy block and the selected new block are the same ("YES" at step 606), the mobile device management module 208 computes a difference between the payload of the selected new block and the payload of the selected legacy block at step 608. In various implementations, the difference may be a number of bytes changed between the payloads of the selected new block and the selected legacy block. Process 600 proceeds to step 610.

In response to determining that the type fields of the selected legacy block and the selected new block are not the same ("NO" at step 606), the mobile device management module 208 determines whether another block that has not yet been processed is present in the legacy configuration file at step 610. In response to determining that another unprocessed block is present ("YES" at step 610), the mobile device management module 208 selects the next unprocessed block from the legacy configuration file at step 612 and process 600 proceeds back to step 606. In response to determining that another unprocessed block is not present— or that all blocks in legacy configuration file have been processed ("NO" at step 610), the mobile device management module 208 determines whether the type field of any block of the legacy configuration file matches the type field of the selected block from the new configuration file at step 614. In response to determining that no blocks of the legacy configuration file have a type field matching the type field of the selected block from the new configuration file ("NO" at step 614), the mobile device management module 208 concludes that the selected block from the new configuration file represents a new block and, thus, generates an update data object that includes the payload of the selected block from the new configuration file at step 616. In various implementations, the mobile device management module

208 generates the update data object as previously described with reference to FIG. 3A and update data object 262.

At step 618, the mobile device management module 208 adds the update data object generated at step 616 to the difference file 258. At step 620, the mobile device management module 208 determines whether another block that has not yet been processed is present in the new configuration file. In response to determining that another unprocessed block is present in the new configuration file ("YES" at step 620), the mobile device management module 208 selects the next unprocessed block from the new configuration file at step 622 and process 600 proceeds back to step 604.

Returning to step 614, in response to the mobile device management module 208 determining that at least one block of the legacy configuration file has a type field matching the type field of the selected block from the new configuration file ("YES" at step 614), the mobile device management module 208 selects the block from the legacy configuration file having (i) the same type field as the type field of the selected block from the new configuration file and (ii) the least computed difference with the payload of the selected block from the new configuration file (e.g., the payload of the selected block of the legacy configuration file is a nearest match to the payload of the selected block of the new configuration file) at step 624. As used herein, a payload of a block from the legacy configuration file may be considered a nearest match to the payload of a new block of the new configuration file if it has a least number of bytes changed as compared to the payload of the new among all of the blocks in the legacy configuration file. In various implementations, if the selected block from the legacy configuration file has (i) the same type field as the selected block of the new configuration file and (ii) the payload with the least computed difference with the payload of the selected block from the new configuration file, the selected block from the legacy configuration file may set as a nearest match to the selected block of the new configuration file. At step 626, the mobile device management module 208 determines whether the computed difference between the payloads of the selected block from the new configuration field and the selected block from the legacy configuration field is equal to 0. In response to determining that the computed difference is 0 (the payloads match—"YES" at step 626), the mobile device management module 208 determines whether the identifier fields of the selected blocks from the new configuration file and the legacy configuration file are equal at step 628.

In response to determining that the identifier fields of the selected blocks from the new configuration file and the legacy configuration file are equal ("YES" at step 628), the mobile device management module 208 excludes the selected block from the new configuration file from the difference file at block 630. A "YES" determination at step 628 results if the type fields, identifier fields, and payloads of the selected blocks from the legacy configuration file and the new configuration file match. In such a scenario, the selected block from the legacy configuration file does not need to be updated, and the compression module does not add an update data object to the difference file corresponding to the selected block of the new configuration file. Process 600 proceeds to step 620. In response to determining that the identifier fields of the selected blocks from the new configuration file and the legacy configuration file do not match ("NO" at step 628), the mobile device management module 208 generates an update data object that includes the identifier field of the block of the new configuration file and the corresponding identifier field of the block of the legacy configuration file at step 632. A "NO" determination at step 628 results if the type fields and the payloads of the selected blocks from the legacy configuration are equal, but the identifier fields are not. In such a scenario, the payloads of the selected blocks are the same, but the instance or location (as indicated by the identifier fields) of the selected blocks are different. This may be the result of a user moving a block in the legacy or new configuration file. As a result, mobile device management module 208 generates an update data object associating the selected blocks of the new configuration file and the legacy configuration file. For example, the mobile device management module 208 may generate the update data object as previously described with respect to FIG. 3C and the update data object 266. At step 634, the mobile device management module 208 adds the update data object generated at step 632 to the difference file 258. Process 600 proceeds to step 620.

Returning to step 626, in response to determining that the computed difference between the payloads of the selected block from the new configuration field and the selected block from the legacy configuration field is not equal to 0 ("NO" at step 626), process 600 proceeds to step 636. At step 636, the mobile device management module 208 determines whether the computed difference between the payloads of the selected block from the new configuration file and the selected block from the legacy configuration field is less than or equal to a threshold. In various implementations, the threshold may be a single byte computed difference. A "YES" determination at step 636 results when the payloads of the selected blocks from the new configuration file and the legacy configuration file differ by only the threshold amount (such as a single byte) but are otherwise identical. A "NO" determination at step 636 results when the payloads of the selected blocks from the new configuration file and the legacy configuration file differ by more than the threshold amount. In response to the mobile device management module 208 determining that the computed difference is not less than or equal to the threshold ("NO" at step 636), the mobile device management module 208 generates an update data object payload based on a difference between the payloads of the selected blocks of the legacy configuration file and the new configuration file at step 638. For example, the mobile device management module 208 generates the update data object as previously described with reference to FIG. 3D and the update data object 268. Process 600 proceeds to step 642.

In response to determining that the computed difference is less than or equal to the threshold ("YES" at step 636), the mobile device management module 208 generates an update data object based on a difference between the different byte of the payload of the legacy configuration file and the different byte of the payload of the new configuration file at step 640. For example, the mobile device management module 208 generates the update data object as previously described with reference to FIG. 3E and the update data object 270. Process 600 proceeds to step 642. At step 642, the mobile device management module 208 adds the update data object to the difference file 258. Process 600 proceeds to step 620.

At step 620, in response to determining that another unprocessed block is not present in the new configuration file ("NO" at step 620), the mobile device management module 208 again selects an initial block from the legacy configuration file at block 648. In various implementations, after all blocks from the new configuration file and all blocks from the legacy configuration file have been processed at the previously described steps, the mobile device management module 208 again compares the blocks from the legacy configuration file and the blocks from the new configuration file to determine whether any blocks from the legacy configuration file are deleted in the new configuration file. At step 650, the mobile device management module 208 again selects an initial block from the new configuration file. At step 652, the mobile device management module 208 determines whether the type and identifier fields of the selected block from the new configuration file and the selected block from the legacy configuration file match. In response to determining that the type and identifier fields match ("YES" at step 652), the mobile device management module 208 identifies the selected block from the new configuration file as a matching block at step 654 and process 600 proceeds to step 656. In response to determining that the type and identifier fields do not match ("NO" at step 652), the mobile device management module 208 determines whether another block that has not yet been processed is present in the new configuration file at step 656. In response to determining that another unprocessed block is present in the new configuration file ("YES" at step 656), mobile device management module 208 selects the next unprocessed block from the new configuration file at block 658 and process 600 proceeds back to step 652.

In response to determining that another unprocessed block is not present in the new configuration file ("NO" at step 656), the mobile device management module 208 determines whether any blocks from the new configuration file were identified as matching at step 654. In response to determining that no blocks were identified as matching ("NO" at step 660), compression module generates an update data object including the identifier field of the selected block of the legacy configuration file and a null data size field at step 662. For example, the mobile device management module 208 generates the update data object as previously described with reference to FIG. 3B and/or update data object 264. At step 664, the mobile device management module 208 adds the update data object to a difference file (such as difference file 258). From step 664, process 600 proceeds to step 666.

Returning to step 660, in response to determining that no blocks were identified as matching ("NO" at step 660), the mobile device management module 208 determines whether another block that has not yet been processed is present in the legacy configuration file at step 666. In response to determining that another unprocessed block is present in the legacy configuration file ("YES" at step 666), the mobile device management module 208 selects the next unprocessed block from the legacy configuration file at step 668 and process 600 proceeds back to step 650. In response to determining that another unprocessed block is not present in the legacy configuration file (e.g., all blocks have been processed in the legacy configuration file—"NO" at step 666), the mobile device management module 208 saves the difference file (for example, as difference file 258 in storage 108) at step 670.

Figure 7:
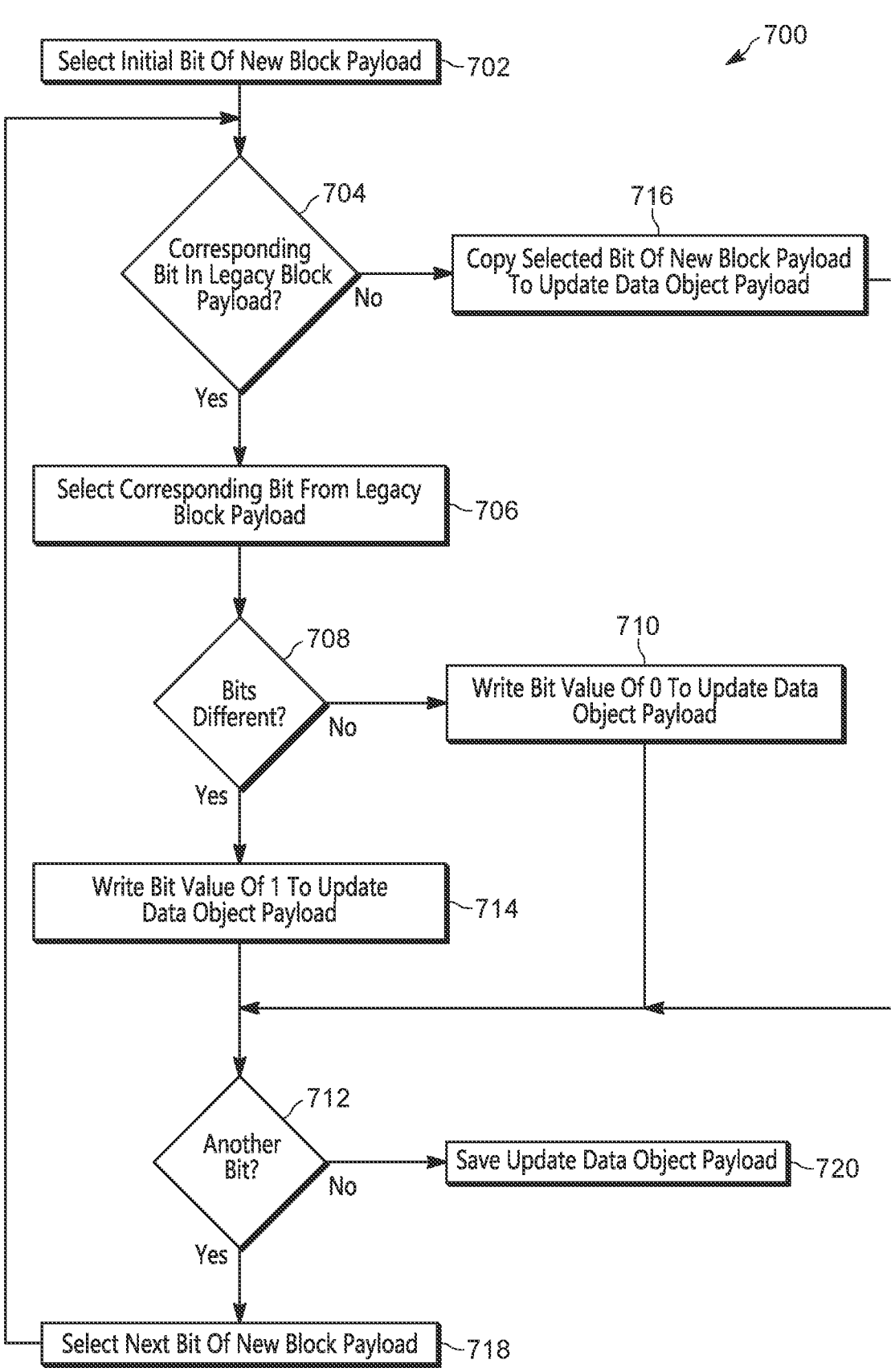
FIG. 7 is a flowchart of an example process for generating a comparison between binary payloads.

FIG. 7 is a flowchart of an example process 700 for generating a comparison between binary payloads. At step 702, the mobile device management module 208 selects an initial bit of a payload of a block of the new configuration file. At step 704, the mobile device management module 208 determines whether a bit corresponding to the bit selected at step 702 is present in the payload of a block of the legacy configuration file. Two bits may correspond to one another if they occupy the same position in their respective sequences (for example, the n-th bit of the payload of the block of the new configuration file may correspond to the n-th bit of the payload of the block of the legacy configuration file). If the payload of the block of the new configuration file is the same length as the payload of the block of the legacy configuration file, then each bit of the payload of the block of the new configuration file may have a corresponding bit in the payload of the block of the legacy configuration file. However, if the payload of the block of the new configuration file is longer than the payload of the block of the legacy configuration file, the payloads may have corresponding bits up to the end of the payload of the block of the legacy configuration file.

In response to determining that a bit corresponding to the selected bit of the block of the new configuration file is present in the block of the legacy configuration file ("YES" at decision block 704), the mobile device management module 208 selects the corresponding bit of the block of the legacy configuration file at step 706. For example, if the n-th bit of the block of the new configuration file was selected at step 702, the mobile device management module 208 correspondingly selects the n-th bit of the block of the legacy configuration file at step 706. At step 708, the mobile device management module 208 determines whether the selected bits are different. In response to determining that the selected bits are not different ("NO" at decision block 708), mobile device management module 208 writes a bit value of 0 to the payload of the update data object at step 710. Process 700 proceeds to decision block 712. In response to determining that the selected bits are different ("YES" at decision block 708), the mobile device management module 208 writes a bit value of 1 to the payload of the update data object at step 714. Process 700 proceeds to decision block 712.

Returning to decision block 704, in response to determining that a bit corresponding to the selected bit of the block of the new configuration file is not present in the block of the legacy configuration file ("YES" at decision block 704), mobile device management module 208 copies the selected bit of the new block payload to the update data object payload at step 716. Process 700 proceeds to decision block 712. At decision block 712, the mobile device management module 208 determines whether another bit that has not yet been processed is present in the payload of the block of the new configuration file. In response to determining that another bit is present ("YES" at decision block 712), the mobile device management module 208 selects the next bit of the payload of the block of the new configuration file at step 718 and process 700 proceeds back to decision block 704. In response to determining that another bit is not present ("NO" at decision block 712), the mobile device management module 208 saves the payload of the update data object at step 720.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the written description and the claims, one or more steps within any given method may be executed in a different order—or steps may be executed concurrently—without altering the principles of this disclosure. Unless otherwise indicated, the numbering or other labeling of instructions or method steps is done for convenient reference and does not necessarily indicate a fixed sequencing or ordering. In the figures, the directions of arrows generally demonstrates the flow of information—such as data or instructions. However, the direction of an arrow does not imply that information is not being transmitted in the reverse direction. The phrase "at least one of A, B, and C" should be construed to indicate a logical relationship (A OR B OR C), where OR is a non-exclusive logical OR, and should not be construed to mean "at least one of A, at least one of B, and at least one of C."

The term computer-readable medium does not encompass transitory electrical or electromagnetic signals or electromagnetic signals propagating through a medium—such as on an electromagnetic carrier wave. The term "computer-readable medium" is considered tangible and non-transitory. The functional blocks, flowchart elements, and message sequence charts described above serve as software specifications that can be translated into computer programs by the routine work of a skilled technician or programmer.

It should also be understood that although certain drawings illustrate hardware and software as being located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or they may be distributed among different computing devices—such as computing devices interconnected by one or more networks or other communications systems.

In the claims, if an apparatus or system is claimed as including one or more electronic processors (and/or other elements) configured in a certain manner (for example, to make multiple determinations), the claim or claimed element should be interpreted as meaning one or more of the electronic processors (and/or other elements) where any combination of the one or more electronic processors (and/or other elements) may be configured to make some or all of the multiple determinations—for example, collectively. To reiterate, those electronic processors and the processing may be distributed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system including:

memory hardware configured to store instructions; and processing hardware configured to execute the instructions, wherein the instructions include:

loading a legacy configuration file including a plurality of legacy blocks, each of the plurality of legacy blocks including a type, an identifier, and a payload;

loading an updated configuration file including a plurality of updated blocks, each of the plurality of updated blocks including a type, an identifier, and a payload;

for each updated block of the plurality of updated blocks:

identifying one legacy block from the plurality of legacy blocks having a same type as the updated block and a payload representing a nearest match to the payload of the updated block, and in response to the payload of the identified one legacy block being equal to the payload of the updated block but having a different identifier than the identifier of the updated block, generating an update data object based on the identifier of the legacy block and the identifier of the updated block and adding the update data object to a difference file; and transmitting the difference file to a mobile device via a radio network to update the legacy configuration file stored at the mobile device.

2. The system of claim 1, wherein identifying the one legacy block from the plurality of legacy blocks having the same type as the updated block and the payload representing the nearest match to the payload of the updated block includes identifying the one legacy block from the plurality of legacy blocks having a payload with a least number of bytes changed as compared to the payload of the updated block.

3. The system of claim 1, wherein the instructions further include:

in response to the identified one legacy block not being equal to the payload of the updated block:

determining an amount of difference between the payload of the identified one legacy block and the payload of the updated block, and in response to the amount of difference satisfying a threshold, generating the update data object based on a comparison of a portion of the payload of the identified one legacy block and a portion of the payload of the updated block and adding the update data object to the difference file.

4. The system of claim 3, wherein the threshold is a one-byte difference between the portion of the payload of the identified one legacy block and the portion of the payload of the updated block.

5. The system of claim 4, wherein the portion of the identified one legacy block is a byte of the payload of the identified one legacy block that differs from the payload of the updated block.

6. The system of claim 3, wherein the comparison includes a bitwise exclusive-OR of the portion of the pay-load of the identified one legacy block and the portion of the payload of the updated block.

7. The system of claim 3, wherein the instructions further include:

in response to the amount of difference not satisfying the threshold, generating the update data object based on the comparison of the payload of the identified one legacy block and the payload of the updated block and adding the update data object to the difference file.

8. The system of claim 3, wherein the instructions further include applying a compression algorithm to at least a portion of the difference file.

9. The system of claim 8, wherein the compression algorithm is a binary compression algorithm.

10. The system of claim 1, wherein the instructions include:

in response to determining that the identifier of the updated block matches the identifier of the identified one legacy block and the payload of the updated block matches the payload of the identified one legacy block, excluding the updated block from the difference file.

11. The system of claim 1, wherein the instructions include:

determining whether the plurality of legacy blocks includes at least one legacy block having the same type as the updated block;

in response to determining that the plurality of legacy blocks does not include at least one legacy block having the same type as the updated block, generating the update data object based on the payload of the updated block;

determining whether the plurality of updated blocks includes at least one updated block having a same type and a same identifier as a selected legacy block; and in response to determining that the plurality of updated blocks does not include at least one updated block having the same type and the same identifier as the selected legacy block, generating the update data object based on the identifier of the selected legacy block and having a null size field.

12. A computer-implemented method including:

loading a legacy configuration file including a plurality of legacy blocks, each of the plurality of legacy blocks including a type, an identifier, and a payload;

loading an updated configuration file including a plurality of updated blocks, each of the plurality of updated blocks including a type, an identifier, and a payload;

for each updated block of the plurality of updated blocks:

identifying one legacy block from the plurality of legacy blocks having a same type as the updated block and a payload representing a nearest match to the payload of the updated block, and in response to the identified one legacy block not being equal to the payload of the updated block:

determining an amount of difference between the payload of the identified one legacy block and the payload of the updated block, and in response to the amount of difference satisfying a threshold, generating an update data object based on a comparison of a portion of the payload of the identified one legacy block and a portion of the payload of the updated block and adding the update data object to a difference file; and transmitting the difference file to a mobile device via a radio network to update the legacy configuration file stored at the mobile device.

13. The method of claim 12, wherein identifying the one legacy block from the plurality of legacy blocks having the same type as the updated block and the payload representing the nearest match to the payload of the updated block includes identifying the one legacy block from the plurality of legacy blocks having a payload with a least number of bytes changed as compared to the payload of the updated block.

14. The method of claim 13, wherein the threshold is a one-byte difference between the portion of the payload of the identified one legacy block and the portion of the payload of the updated block.

15. The method of claim 14, wherein the portion of the identified one legacy block is a byte of the payload of the identified one legacy block that differs from the payload of the updated block.

16. The method of claim 12, wherein the comparison includes a bitwise exclusive-OR of the portion of the payload of the identified one legacy block and the portion of the payload of the updated block.

17. A non-transitory computer-readable medium comprising executable instructions, wherein the executable instructions include:

loading a legacy configuration file including a plurality of legacy blocks, each of the plurality of legacy blocks including a type, an identifier, and a payload;

loading an updated configuration file including a plurality of updated blocks, each of the plurality of updated blocks including a type, an identifier, and a payload;

for each updated block of the plurality of updated blocks:

identifying one legacy block from the plurality of legacy blocks having a same type as the updated block and a payload representing a nearest match to the payload of the updated block, and in response to the payload of the identified one legacy block being equal to the payload of the updated block but having a different identifier than the identifier of the updated block, generating an update data object based on the identifier of the legacy block and the identifier of the updated block and adding the update data object to a difference file; and transmitting the difference file to a mobile device via a radio network to update the legacy configuration file stored at the mobile device.

18. The non-transitory computer-readable medium of claim 17, wherein identifying the one legacy block from the plurality of legacy blocks having the same type as the updated block and the payload representing the nearest match to the payload of the updated block includes identifying the one legacy block from the plurality of legacy blocks having a payload with a least number of bytes changed as compared to the payload of the updated block.

19. The non-transitory computer-readable medium of claim 17, wherein the executable instructions further include:

in response to the identified one legacy block not being equal to the payload of the updated block:

determining an amount of difference between the payload of the identified one legacy block and the payload of the updated block, and in response to the amount of difference satisfying a threshold, generating the update data object based on a comparison of a portion of the payload of the identified one legacy block and a portion of the payload of the updated block and adding the update data object to the difference file.

20. The non-transitory computer-readable medium of claim 17, wherein the executable instructions further include:

determining whether the plurality of legacy blocks includes at least one legacy block having the same type as the updated block; and in response to determining that the plurality of legacy blocks does not include at least one legacy block having the same type as the updated block, generating the update data object based on the payload of the updated block.

* * * * *